United States Patent [19]
Schrock et al.

[11] 3,911,546
[45] Oct. 14, 1975

[54] METHOD OF FORMING HEAD MEMBER HAVING INTEGRAL VALVE SEATS FOR REED VALVE

[75] Inventors: Martin Omer Schrock, Baltimore; Albert Andreas Wilhelmi, Baldwin, both of Md.

[73] Assignee: The Black and Decker Manufacturing Company, Towson, Md.

[22] Filed: June 28, 1974

[21] Appl. No.: 484,145

[52] U.S. Cl.... 29/157.1 R; 29/156.7 R; 29/156.7 A; 72/333; 72/379; 251/368; 137/512; 137/512.1 S
[51] Int. Cl.² ........................................ B21D 53/00
[58] Field of Search............ 29/156.4 R, 156.7 R, 29/156.7 A, 157.1 R, DIG. 9, DIG. 18, 29/DIG. 37, DIG. 47; 72/335, 333, 332, 324, 72/352, 354, 373–375, 377, 379; 251/333, 251/359, 368; 137/512, 512.15, 512.4; 113/116 D

[56] References Cited
UNITED STATES PATENTS

| | | | |
|---|---|---|---|
| 3,365,926 | 1/1968 | Price | 72/379 X |
| 3,509,907 | 5/1970 | Gannaway | 137/512 |
| 3,513,684 | 5/1970 | Price | 72/379 X |
| 3,751,005 | 8/1973 | Earley | 137/512.15 X |
| 3,766,619 | 10/1973 | Hudson, Jr. | 29/157.1 R |
| 3,776,016 | 12/1973 | Quinn et al. | 72/333 X |
| 3,796,086 | 3/1974 | Phillips | 29/155 R X |

*Primary Examiner*—Lowell A. Larson
*Assistant Examiner*—Joseph A. Walkowski
*Attorney, Agent, or Firm*—Edward D. Murphy; Leonard Bloom; William Kovensky

[57] ABSTRACT

A method for forming integral valve seats in a valve head member for a reed valve assembly in which the valve seats are formed by coining the peripheral portions about valve ports to form smooth raised work hardened valve seat surfaces.

6 Claims, 6 Drawing Figures

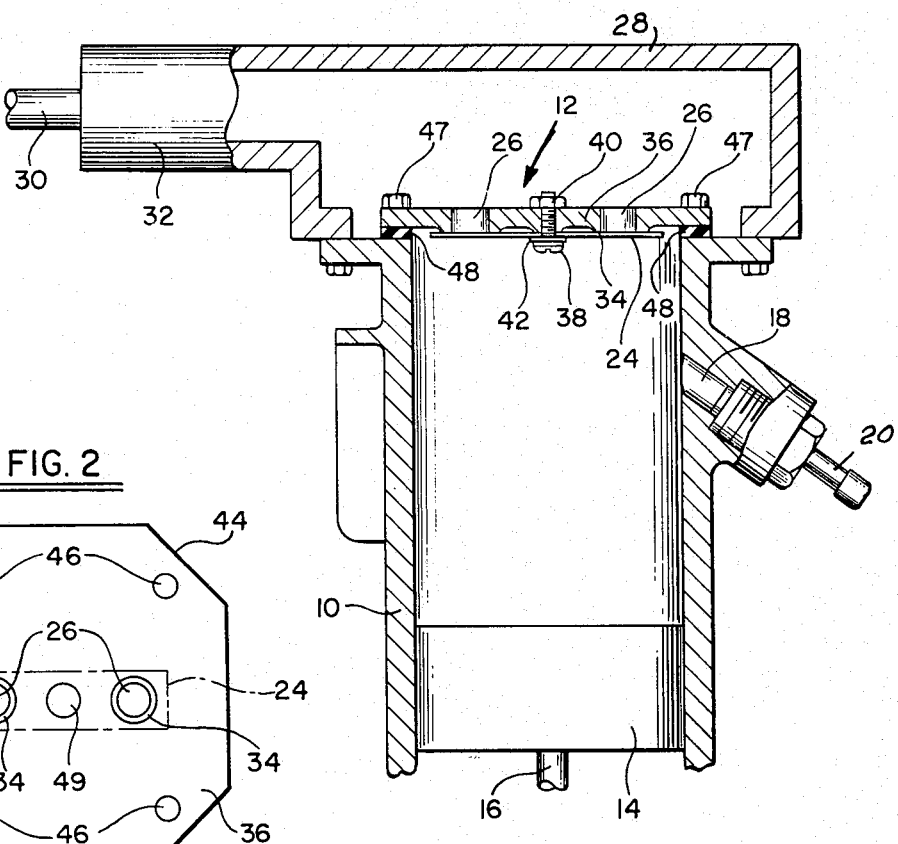
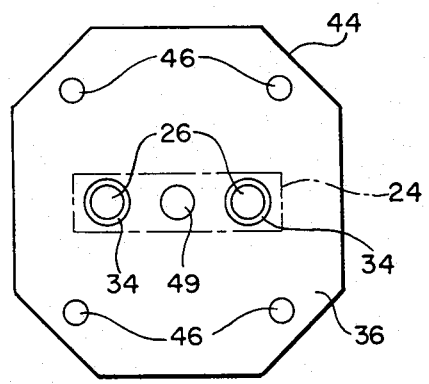
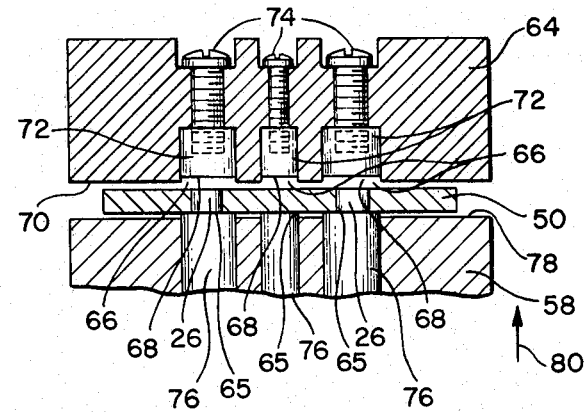
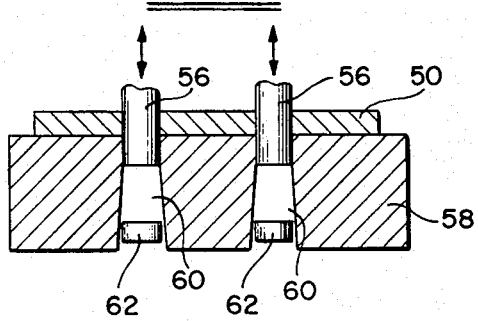
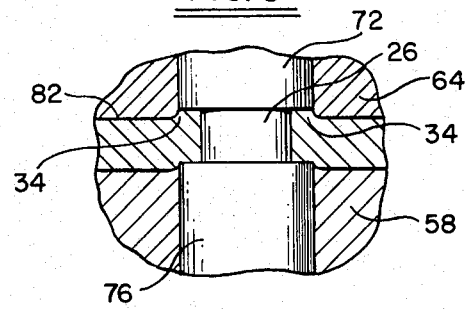

3,911,546

METHOD OF FORMING HEAD MEMBER HAVING INTEGRAL VALVE SEATS FOR REED VALVE

FIELD OF THE INVENTION

The present invention relates generally to a method of forming integral valve seats in a valve head member used with a reed valve assembly, and more particularly, to a method of forming valve seats wherein the peripheral portions of the valve head member about valve ports are coined to form a raised work hardened smooth valve seat.

BACKGROUND OF THE INVENTION

In the past, when forming valve seats for a reed valve assembly of the type used in U.S. application Ser. No. 364,812 filed May 29, 1973 by Dwyer, et al and commonly assigned, it has been customary to cast a valve head member with raised portions which are to be formed into valve seats and to subsequently machine the raised portions and the mounting surface. There are several inherent disadvantages in the foregoing method, the principle one being that it is rather expensive to cast and grind the mounting surface and machine the ports by grinding the raised peripheral surfaces to form a relatively smooth surface which is adapted to be contacted by the reed valve member of the reed valve assembly. The ground valve seat surface, while relatively smooth to the naked eye, is striated, and such a striated surface may wear more rapidly than a relatively smooth non-striated surface. Furthermore, in order to provide the requisite strength in the valve head member, it is necessary to make a comparatively thick casting. In addition, the casting is somewhat porous.

OBJECTS AND SUMMARY OF THE INVENTION

In order to overcome the relatively high cost of the prior art construction and the inherent structural disadvantages, the present invention proposes to form a valve head member having raised integral valve seats by coining the peripheral portions about valve ports in a valve head member formed from sheet metal stock. The head member may comprise a cylinder head or a separate valve plate. The coining operation is accomplished by engaging the peripheral edge portions adjacent one side of the head member with a circular die and disposing another die having corresponding circular recesses adjacent the other side of the valve head member, and by then moving the circular dies towards the circular recesses to coin the material between the two dies. There are numerous inherent advantages in the foregoing method as broadly outlined above. Thus, comparatively thin wrought high strength sheet metal having parallel surfaces may be employed in the manufacture of the valve head member materially reducing metal cost, providing for a non-porous head member, and eliminating the requirement of machining the mounting surface. Additional work hardening of the valve seats is accomplished by the coining operation to provide a surface area contacted by the reed valve member which has higher strength characteristics and is therefore inherently less likely to wear. By employing a die having circular recesses, the surface of the recesses being smooth and parallel to the remainder of the surface area of the die, very close tolerances are achieved in establishing the plane of the valve seats. Furthermore, the smooth recessed areas into which the peripheral portions are coined provide an inherently smoother surface area which will wear better than the striated surface area formed by the previous casting and grinding method. Due to the improved surface finish and hardness of the valve seat, which will lead to a longer lasting valve seat, the surface area of the valve seat may be reduced which will permit higher unit loading at the valve seat by the reed valve member and a reduction of pneumatic cushion effects which will permit the reed valve member to close more quickly.

The method of manufacture of the valve head member with integral valve seats can be more fully appreciated from the following detailed description taken in conjunction with the accompanying drawings.

BRIEF DESCRIPTION OF THE DRAWINGS

FIG. 1 is a somewhat schematic view, partially in section, of a portion of an apparatus in which a valve head member formed by the method of this invention may be utilized.

FIG. 2 is a plan view of one side of a valve head member made in accordance with the method of this invention, the reed valve member being illustrated in phantom.

FIG. 3 is a section through mating dies showing the manner in which valve ports are formed in a blank which is to be subsequently formed into a valve head member.

FIG. 4 is a section similar to FIG. 3 showing a valve head member blank disposed within a pair of mating dies which are adapted to coin integral valve seats into the valve head member.

FIG. 5 is an enlarged fragmentary view showing the completion of the coining operation about the peripheral portions adjacent a valve port.

DETAILED DESCRIPTION OF THE PREFERRED EMBODIMENT

Figure 6:
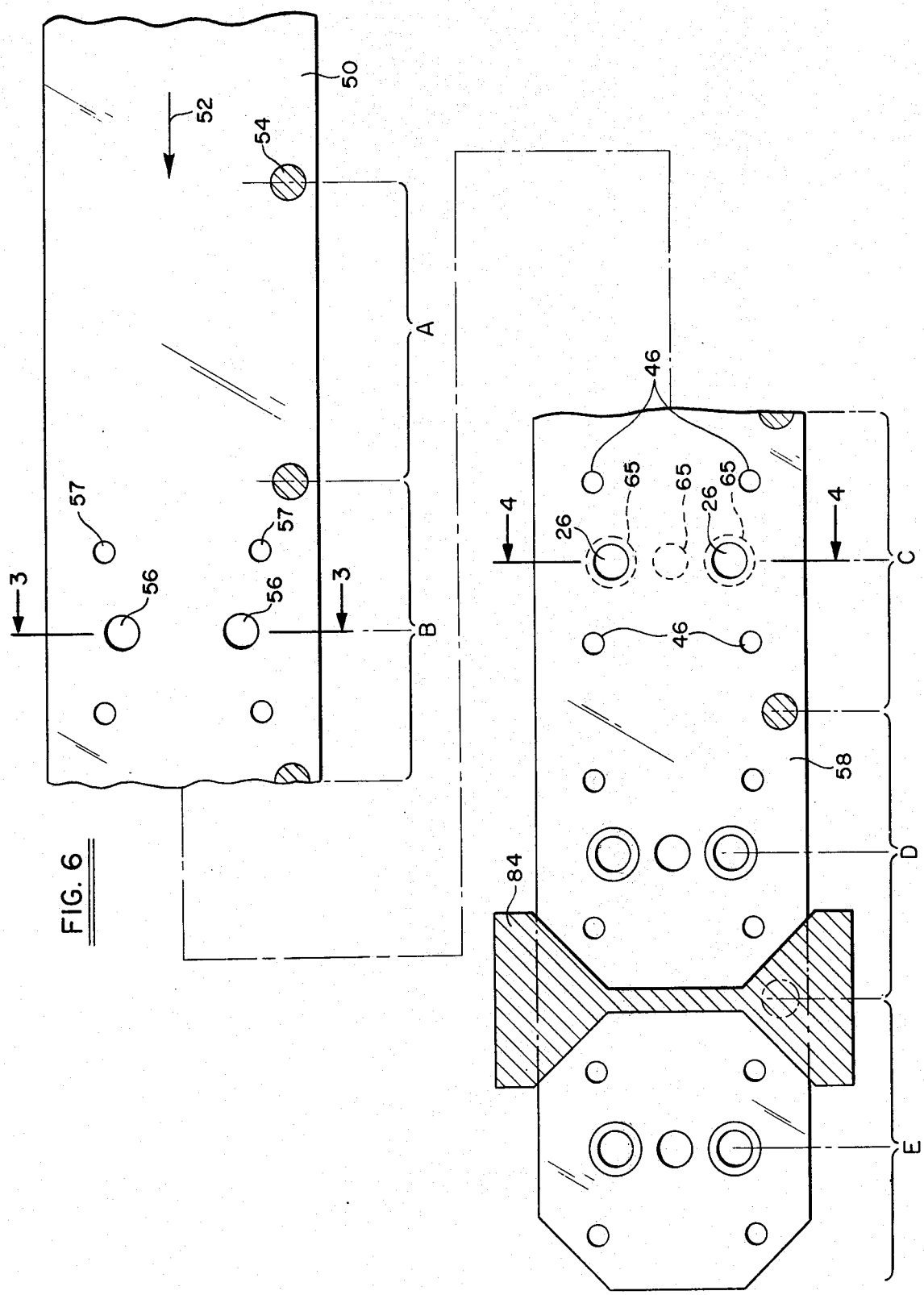
FIG. 6 is a sectional view through the interface of two dies which may be employed in the practice of this invention, this view looking down upon the stock from which the valve head members are manufactured.

Referring first to FIG. 1, an apparatus is shown which includes a cylinder 10 which is closed off at one end by a reed valve assembly indicated generally at 12, and at the other end by a piston 14, the piston being in turn interconnected with a piston rod 16. One side of the cylinder is provided with an outlet port 18, there being a fitting 20 disposed about the outlet port 18, the fitting in turn receiving a flexible air hose (not shown). A reed valve member 24 is mounted adjacent the inner side or cylinder side of the reed valve assembly, the reed valve member 24 being adapted to close inlet ports 26 during that stroke of the piston as it moves towards the reed valve assembly. The other side of the reed valve assembly 12 is in communication with an inlet manifold 28 which is in turn interconnected with an open air line 30 through a filter 32.

The operation of the foregoing apparatus is well known to those skilled in the art. However, it should be noted that when the piston 14 is caused to be moved away from the reed valve assembly 12, that air will be drawn into the cylinder 10 through the ports 26, inlet manifold 28, filter 32 and open air line 30. Upon reverse movement of the piston, that is, as it moves toward the reed valve assembly, the reed valve member will be forced into contact with the seats 34 of the valve head member 36, the presurized air being discharged through the air hose 22. It should be noted that the reed valve member 24, which in the present embodiment is preferably formed out of spring stainless steel, is secured to the valve head member by means of a machine screw 38 and nut 40, the head of the screw 38 bearing against a washer 42.

The valve head member 36 is best shown in FIG. 2 and may have an octagonal periphery 44 or it could have a circular periphery. An octagonal periphery is preferred simply for ease of manufacture. Four mounting apertures 46 are provided in the valve head member 36, and bolts 47 are employed to secure the valve head member to the cylinder, the bolts 47 passing through the apertures 46, there being a gasket 48 disposed between the valve head member 36 and one end of the cylinder 10. Two spaced apart ports 26 are disposed centrally of the valve head member 36, the ports 26 being located at equal distances from either side of a raised portion 49 upon which the reed valve member 24 is mounted. The peripheral portions about each of the apertures 26 are raised into valve seats 34, the raised surface of the seats 34 lying in the same plane as the raised portion 49.

The valve head member 36 may be formed in a progressive die in a manner illustrated in FIG. 6 by feeding a strip of stock 50 of the desired width in the direction indicated by the arrow 52, the stock being progressively advanced to each of the various stations A, B, C, D, and E. The stock is preferably 2024-T4 aluminum sheet, however, any suitable stock may be employed which possesses the desired characteristics. At the first station A a pilot hole is formed in the stock by punch 54. After the stock has been advanced one station to station B, it is then pierced by means of suitable punches 56, 57 to form the ports 26 and mounting apertures 46. In this regard, the bottom die 58 is provided with suitable tapered recesses 60 (FIG. 3) and the punches 56, 57 are driven through the stock 50 to eject slugs 62 through the apertures 60. The punches 56, 57 are then retracted and the stock 50 is then indexed to station C.

At station C a coining operation is performed by dies 58 and 64 which are provided with circular raised portions 65 and corresponding recesses 66, respectively, for each of the ports 26 and the raised portion 49 upon which the reed valve member 24 is to be mounted. To this end the upper die 64 (FIG. 4) is provided with spaced apart circular recesses 66, each of the recesses having a smooth surface 68 which is parallel to the adjacent surface 70 of the die. Each of the recesses in the upper die is formed by providing a first lower circular aperture in the die which receives a removable cylindrical die part 72, and by forming second and third apertures concentric with the first aperture, the second and third apertures receiving a screw or the like 74 which holds the die parts 72 securely within the upper die 64. The cylindrical recess 66 which is employed to form the raised portion 49 has its surface 68 co-planar with the surfaces 68 of the other cylindrical recesses. The raised portions 65 in the lower die 58 are the upper end portions of circular die parts 76, the upper end surface of each die part lying in a plane parallel to the adjacent upper plane 78 of the lower die. The die parts 76 may be mounted in the lower die 58 in a manner similar to the manner in which the die parts 72 are secured to the upper die 64. It should be noted that the two dies 58 and 64 are held from lateral shifting movement relative to each other and that the raised circular portions 76 of the lower die 58 are disposed in concentric alignment with the recesses 66 in the upper die 64.

The stock 50 is placed in the dies 64 and 58 at station C with the ports 26, which have been formed by the punching operation at the previous station (station B) in alignment with the raised circular portions 65 and also in concentric alignment with the recesses 66. To coin the valve seats 34 it is only necessary to move the lower die 58 upwardly in the direction indicated by the arrow 80 from the position shown in FIG. 4 to the position shown in FIG. 5. The peripheral portions of the stock 50 about each of the ports 26 will be deformed or coined upwardly by the action of the lower die as it moves upwardly to form a valve seat. After the lower die has been moved upwardly its full stroke, the surface of the valve seat 34 will be in contact with the die part 72, and will have a work hardened surface which lies in a plane parallel to the adjacent surface 82 of the stock, the surface of the valve seat also being very smooth. In addition, the raised portion 49 will also lie in the same plane as the valve seat so that when the reed valve member is mounted thereon, it will be disposed in a planar condition when contacting the valve ports to seal the reed valve assembly 12.

After the valve seat 34 and the raised portion 48 have been coined, the stock 50 is then advanced to station D and the leading end of the stock is sheared into its desired shape by shear 84. The stock 50 is then advanced to station E where its trailing end is also sheared to the desired shape by shear 84, the finished valve head member then being discharged from the progressive die.

In the practice of this invention it has been found desirable to punch down and coin up. Thus, when forming the ports 26 by punching down, the blanks or slugs 62 can be advantageously discharged. By coining up there is less danger of having any chips lying between the upper die 54 and the upper surface 82 of the stock 50 and thus, there is less likely to be any imperfections in the surface of the valve piece. Upon the completion of the operation, it will then be necessary to mount the reed valve member 24 on the valve head member 36. In this regard it should be noted that it will be necessary to form an aperture for the reception of the machine screw 38. However, the aperture may be formed in the dies.

While a preferred embodiment has been disclosed above, it is to be understood that the invention is not to be limited to the above embodiment as various alternative embodiments will occur to those having ordinary skill in the art.

We claim:

1. A method of forming a valve seat for a reed valve of the type having a valve seat disposed about the periphery of a valve port in a head member, and a reed member mounted on one side of the head member in cooperative relationship with said valve seat, said method comprising the steps of:

forming an aperture within sheet metal head stock, said stock having spaced apart parallel surfaces;

providing a first die having a generally planar surface and a recessed area in its generally planar surface of greater diameter than said aperture in said head stock, said recessed area having a smooth surface parallel to the generally planar surface of the die;

placing the stock adjacent to the generally planar surface of the first die with the aperture in the head stock in concentric alignment with the recess in the die; and deforming peripheral portions of the stock adjacent to the aperture into said recessed area of said first die until the peripheral portions contact the smooth surface of the recessed area to form a raised valve seat having a smooth work hardened surface parallel to the adjacent surface of the head stock.

2. The method set forth in claim 1 in which said deforming step is accomplished by providing a second die having a generally planar surface parallel to and corresponding to the recessed area in said first die, said second die being disposed in concentric alignment with said recessed area on the opposite side of said head stock, and moving the second die towards the first die until it contacts the other surface of said head stock and subsequently continuing movement of the second die towards the first die to deform the metal between the two dies until the surface of the head stock adjacent the first die contacts the recessed area.

3. A method of forming a valve head member having integral valve seats for a reed valve assembly of the type having a reed valve member mounted on one side of the head member in cooperative relationship with valve seats formed in said head member, said valve seats extending about the periphery of apertures which extend through said head member, said apertures defining valve ports; said method comprising the steps of:

providing sheet metal stock which is to be formed into said head member, said sheet metal head stock having smooth opposed parallel surfaces;

forming a pair of spaced apart apertures within said sheet metal head stock, providing a first die having a generally planar surface and a pair of spaced apart recessed areas in the generally planar surface, each of said recessed areas having a greater diameter than said spaced apart apertures in said stock, each of said recessed areas being of the same depth, and each of said recessed areas having a smooth surface parallel to the generally planar surface of the die;

placing one surface of the sheet metal head stock adjacent the generally planar surface of the die with the apertures in the sheet metal head stock in concentric alignment with the recesses in the die; and simultaneously deforming the peripheral portions of the sheet metal head stock adjacent the apertures into said recessed areas of the die until the peripheral portions contact the smooth surface of the recessed area to form raised integral valve seats having a smooth work hardened surface parallel to the adjacent surface of the sheet metal head stock.

4. The method set forth in claim 3 in which said first die has an additional recessed area of equal depth to the first two spaced apart areas, the additional recessed area lying midway between the two recessed areas, said method including the step of deforming sheet metal head stock material lying between said spaced apart apertures into said additional recessed area to form a raised portion lying in the same plane as the raised valve seats at the same time the peripheral portions are deformed; and mounting a reed valve member onto said raised portion.

5. The method set forth in claim 3 in which said deforming step is accomplished by providing a second die having generally planar surfaces parallel to and corresponding to the said recessed areas in said first die, the planar surfaces of said second die being disposed on the opposite side of said sheet metal head stock in concentric alignment with said recessed areas in said first die, moving the second die toward the first die until it contacts said opposite side of said sheet metal head stock, and subsequently continuing movement of the second die towards the first die to deform the sheet metal head stock between the two dies until said one surface of the sheet metal head stock adjacent the first die contacts the recessed areas.

6. The method set forth in claim 3 wherein said spaced apart apertures are formed within said sheet metal head stock by a punching operation.

* * * * *